Sprague & Osgood,
Seed Sower.
No. 92,389. Patented July 6, 1869.
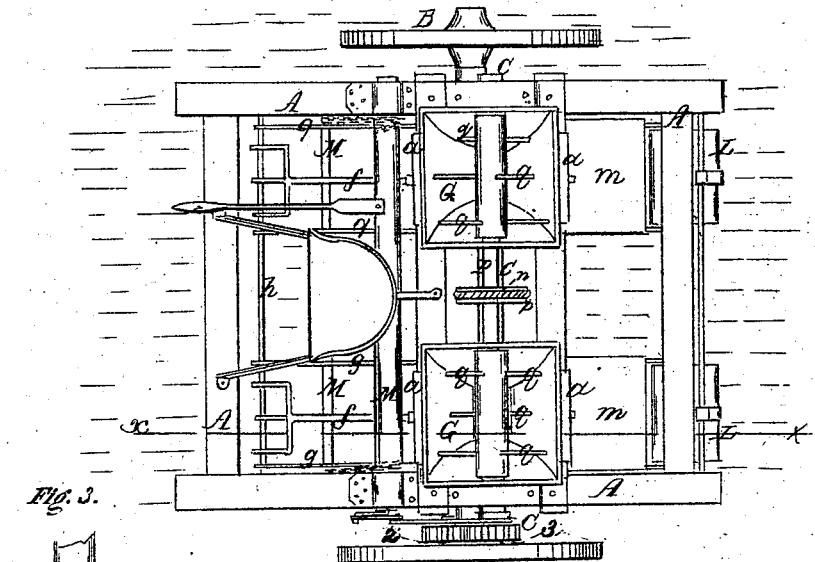
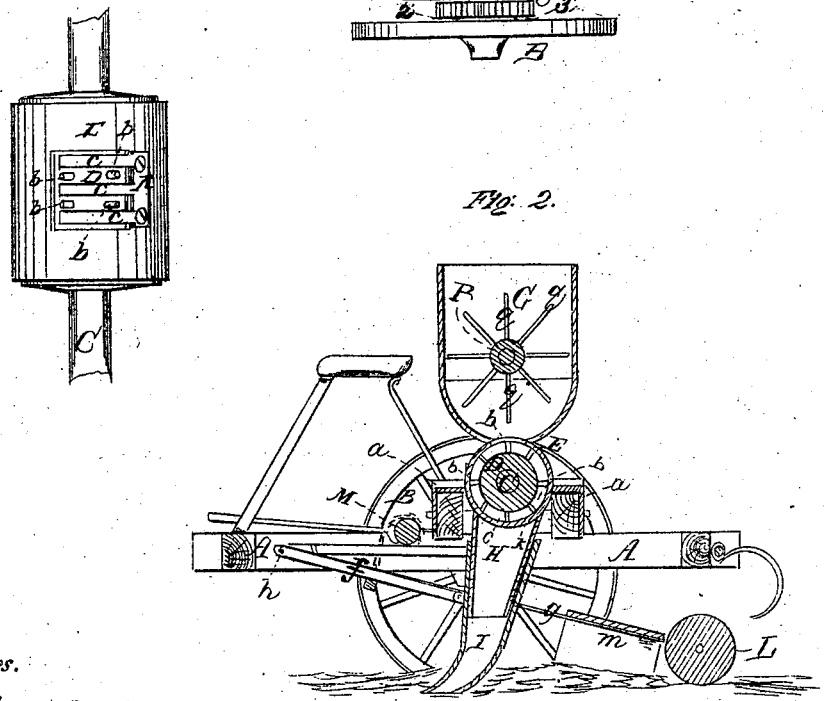
Witnesses:
Chas. L. Spencer
Geo. H. Mratt
A. & M. Sprague
R. F. Osgood
by J. Fraser
atty.

United States Patent Office.

A. V. M. SPRAGUE AND R. F. OSGOOD, OF ROCHESTER, NEW YORK.

Letters Patent No. 92,389, dated July 6, 1869.

IMPROVEMENT IN COTTON-SEED PLANTERS.

The Schedule referred to in these Letters Patent and making part of the same.

*To all whom it may concern:*

Be it known that we, A. V. M. SPRAGUE and R. F. OSGOOD, both of the city of Rochester, in the county of Monroe, and State of New York, have invented a certain new and useful Improvement in Cotton-Seed Planters; and we do hereby declare that the following is a full and exact description thereof, reference being had to the accompanying drawings, making part of this specification, in which—

Figure 1 is a plan;

Figure 2, a vertical section in plane of line $x\ x;$ and

Figure 3, a bottom view, showing the comb arrangement.

Like letters of reference indicate corresponding parts in all the figures.

Our invention consists in combining with the seed-rollers an arrangement of comb-teeth, by which the seed is properly discharged and separated, so as to be equally distributed in the drills.

It further consists in the arrangement and adaptation of parts as hereinafter set forth.

In the drawings—

A indicates the main frame, and B B the driving-wheels, the latter having on one side, or both, a set of gears, 1, 2, 3, which give motion to a roller-shaft, C.

On this shaft are situated two seed-rollers, D D, working respectively in close-fitting cylinders E E, whose flanges $a\ a$ slide upon cross-bars of the main frame, and are secured in any desired position by pins or screws.

The seed-rollers are provided with circular rows of projecting teeth or pins $b\ b$, which catch the seeds as they fall down from the hoppers G G, and discharge them, at the bottom, into the seed-conductors H H, whence they fall into the drill-teeth I I.

On the under side of the cylinders E are bolted, or otherwise attached, combs K K, which have long teeth $c\ c$, gently curving inward, till they come in close contact with the periphery of the rollers, where they rest between the teeth or pins $b\ b$, filling nearly the whole lateral space.

The outer surface of these comb-teeth we prefer to make of flat form, and smooth, to properly discharge the seed; and we also prefer to make the ends touching the cylinders square across the point, so as to take up the seed without catching the fibres.

The operation of this portion of the invention will be readily understood.

As the seeds fall down the hoppers, and through the top of the enclosing cylinders, they are caught by the projecting teeth of the seed-rollers, and carried down in the space between the periphery of said rollers and the cylinder.

When they arrive at the discharge-opening at the under side, they are caught by the ends of the comb-teeth, and gradually carried up upon its inclined surface to the outside, when they drop into the conductors, as before stated.

This arrangement of the comb-teeth we believe to be new.

They serve a very important purpose, in clearing the seeds from their contact with the roller, and carrying them outward and discharging them properly.

Great difficulty has been heretofore experienced in discharging cotton-seed, owing to its fibrous covering and clinging nature, but we have found, by actual test, that it can be accomplished in the most perfect manner by the use of the comb-teeth, which, filling the whole space transversely between the teeth of the rollers, and fitting closely to the surface of the same, raise the seeds from their place without disturbing the fibres.

The enclosing-cylinders E also serve an important purpose, by retaining the seed in the opening around the centre of the rollers, preventing any escape, and obviating clogging, which would occur were the seed-rollers exposed.

These cylinders are essential in concentrating and holding the seed, and properly feeding it to the discharge.

The cylinders, seed-rollers, hoppers, and drill-teeth, are made to adjust nearer together or further apart, as necessity may require.

The rollers are loosened by simply unkeying, and slide along with the cylinders upon the shaft.

The drill-teeth I and covering-rollers L are connected, by draught-rods $f\ g\ g$, with an axis, $h$, and are adjusted by simply sliding the bearings laterally upon said axis.

By this means, the machine is adapted to planting the drills at any desired distance apart.

The drill-teeth (and rollers, if desired,) are elevated by means of a rock-shaft, M, or any equivalent arrangement.

The draught-bars, to which the rollers are attached, have covering-wings, $m\ m$, in advance of the rollers, for the purpose of drawing the dirt over the rows.

In the centre of the roller-shaft C is situated a gear or pulley, $n$, which engages with a similar gear or pulley, $p$, of a shaft, P, running through the hoppers.

Inside the hoppers this shaft is armed with pins $q\ q$, which project to a suitable extent, to agitate or stir up the seed in the hoppers, to feed it properly down to the seed-rollers below.

This arrangement is necessary, owing to the fibrous nature of the seed, and consequent clogging.

By removing the hoppers and seed-rollers from the frame, and applying others adapted to dropping corn, the machine is readily converted into a corn-planter.

What we claim as our invention, and desire to secure by Letters Patent, is—

The combination of the comb K and enclosing cylinder E, with the seed-roller D, said parts being so arranged that an annular chamber is left between the periphery of the roller and the cylinder, for the retention of the seed, and the comb-teeth project from the outside of the cylinder, through the discharge-opening at the bottom, and rest against the roller, as herein set forth.

Also, the arrangement of the cylinders E, seed-rollers D, combs K, drill-teeth I, and covering-rollers L, when the said parts are capable of lateral adjustment, in the manner and for the purpose specified.

In witness whereof, we have hereunto signed our names, in the presence of two subscribing witnesses.

A. V. M. SPRAGUE.
R. F. OSGOOD.

Witnesses:
H. D. McNAUGHTON,
GEO. W. MIATT.